United States Patent
Nakano et al.

(10) Patent No.: US 7,119,734 B2
(45) Date of Patent: Oct. 10, 2006

(54) TARGET DETERMINATION APPARATUS, TARGET JUDGMENT APPARATUS, AND DETERMINATION AID APPARATUS

(75) Inventors: Masao Nakano, Kanagawa (JP); Kimihisa Yoneda, Hyogo (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 118 days.

(21) Appl. No.: 10/854,242

(22) Filed: May 27, 2004

(65) Prior Publication Data

US 2004/0246169 A1 Dec. 9, 2004

(30) Foreign Application Priority Data

Jun. 3, 2003 (JP) .............................. 2003-157573

(51) Int. Cl.
*G01S 13/93* (2006.01)
(52) U.S. Cl. ..................... 342/70; 342/90; 342/109
(58) Field of Classification Search ................... 342/70
See application file for complete search history.

(56) References Cited

U.S. PATENT DOCUMENTS

| | | | | |
|---|---|---|---|---|
| 5,826,216 A | * | 10/1998 | Lyons et al. ............... 702/143 |
| 5,929,802 A | * | 7/1999 | Russell et al. ............... 342/70 |
| 6,377,205 B1 | * | 4/2002 | Eckersten et al. ............. 342/90 |
| 2003/0016161 A1 | * | 1/2003 | Okai et al. ..................... 342/70 |
| 2003/0142006 A1 | * | 7/2003 | Walton et al. ................. 342/70 |
| 2003/0151541 A1 | * | 8/2003 | Oswald et al. ................ 342/70 |
| 2004/0246167 A1 | * | 12/2004 | Kumon et al. ................ 342/70 |

FOREIGN PATENT DOCUMENTS

JP    A 11-133151    5/1999

OTHER PUBLICATIONS

Radar Cross Section (RCS). Sep. 13, 2001. pp. 4-11.1-4-11.5. http://web.archive.org/web/20010913091631/http://ewhdbks.mugu.navy.mil/rcs.pdf.*
U.S. Appl. No. 10/854,714, filed May 27, 2004, Nakano et al.

* cited by examiner

*Primary Examiner*—Thomas H. Tarcza
*Assistant Examiner*—Matthew Barker
(74) *Attorney, Agent, or Firm*—Oliff & Berridge, PLC

(57) ABSTRACT

A target determination apparatus for determining type of a target, includes a transmission unit, a reception unit, and a determination unit. The transmission unit emits an electromagnetic wave. The reception unit receives the electromagnetic wave reflected at the target to obtain reception information. The determination unit determines the type of the target on the basis of radar cross section obtained from the reception information.

15 Claims, 15 Drawing Sheets

FIG. 3

| RADAR CROSS SECTION | TYPE OF OBJECT |
|---|---|
| EQUAL TO OR MORE THAN $a_1$ dBm$^2$, AND LESS THAN $a_2$ dBm$^2$ | HUMAN BEING |
| EQUAL TO OR MORE THAN $a_2$ dBm$^2$, AND LESS THAN $a_3$ dBm$^2$ | VEHICLE (OTHER THAN LARGE VEHICLE) |
| EQUAL TO OR MORE THAN $a_3$ dBm$^2$, AND LESS THAN $a_4$ dBm$^2$ | VEHICLE (LARGE) |
| EQUAL TO OR MORE THAN $a_4$ dBm$^2$, AND LESS THAN $a_5$ dBm$^2$ | BUILDING |

FIG. 6

| TYPE OF OBJECT | MASS OF OBJECT |
|---|---|
| HUMAN BEING | 100kg |
| VEHICLE (OTHER THAN LARGE VEHICLE) | 1,500kg |
| VEHICLE (LARGE) | 3,000kg |
| BUILDING | 10,000kg |

FIG. 12

| RADAR CROSS SECTION | TYPE OF OBJECT |
|---|---|
| EQUAL TO OR MORE THAN $b_1$ dBm$^2$, AND LESS THAN $b_2$ dBm$^2$ | HUMAN BEING |
| EQUAL TO OR MORE THAN $b_2$ dBm$^2$, AND LESS THAN $b_3$ dBm$^2$ | GRAY ZONE |
| EQUAL TO OR MORE THAN $b_3$ dBm$^2$, AND LESS THAN $b_4$ dBm$^2$ | VEHICLE (OTHER THAN LARGE VEHICLE) |
| EQUAL TO OR MORE THAN $b_4$ dBm$^2$, AND LESS THAN $b_5$ dBm$^2$ | GRAY ZONE |
| EQUAL TO OR MORE THAN $b_5$ dBm$^2$, AND LESS THAN $b_6$ dBm$^2$ | VEHICLE (LARGE) |
| EQUAL TO OR MORE THAN $b_6$ dBm$^2$, AND LESS THAN $b_7$ dBm$^2$ | GRAY ZONE |
| EQUAL TO OR MORE THAN $b_7$ dBm$^2$, AND LESS THAN $b_8$ dBm$^2$ | BUILDING |

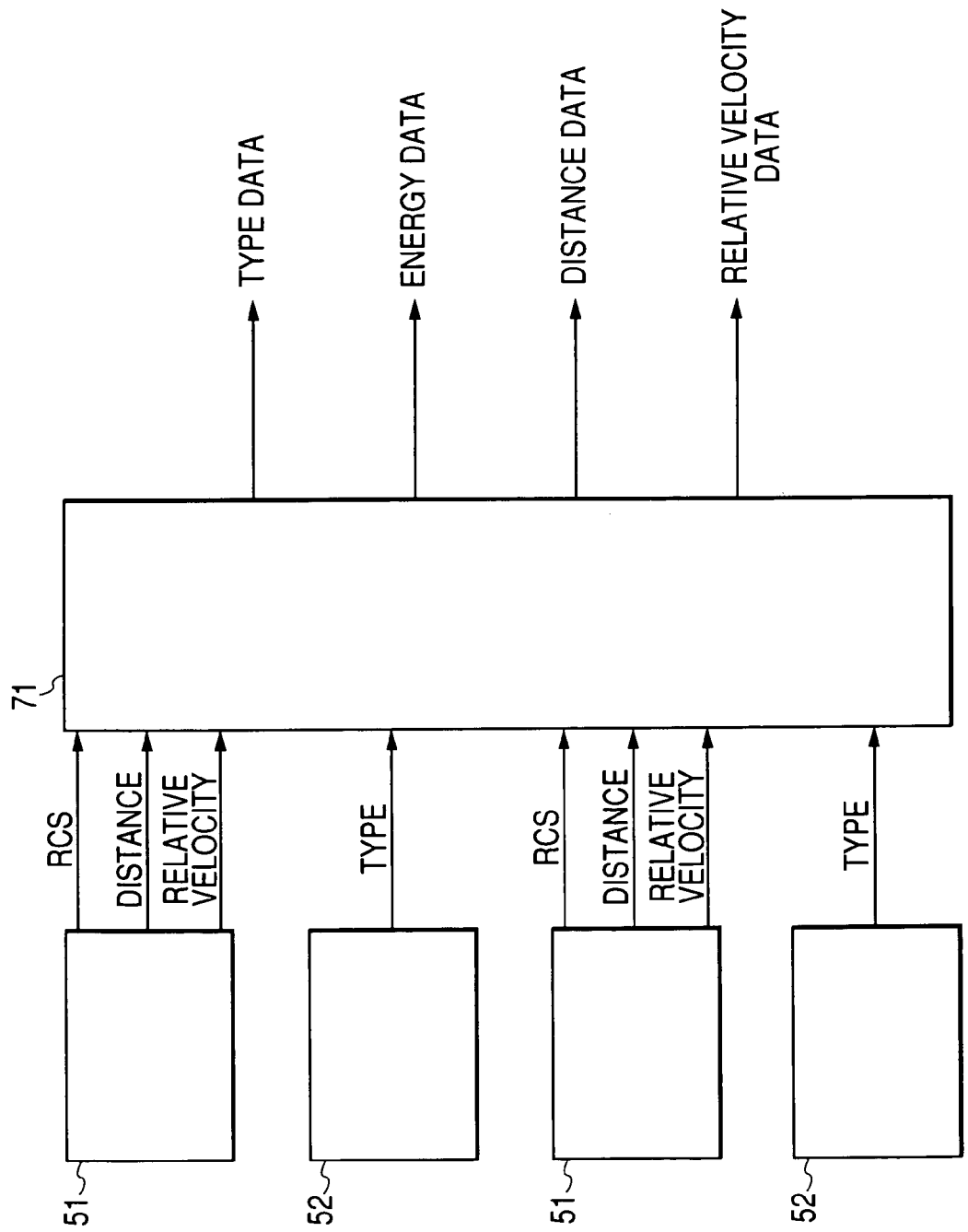

TARGET DETERMINATION APPARATUS, TARGET JUDGMENT APPARATUS, AND DETERMINATION AID APPARATUS

BACKGROUND OF THE INVENTION

1. Field of the Invention

This invention relates to a target determination apparatus, a target judgment apparatus, and a determination aid apparatus and more particularly to a target determination apparatus for determining the type of target, a target judgment apparatus for judging the type of target, and a determination aid apparatus for aiding the target determination apparatus, which determines the type of target.

2. Description of the Related Art

A system for measuring the distance between a vehicle and another vehicle ahead and the relative velocity therebetween using a radar (radio detecting and ranging) technology and holding the distance between the vehicle and the other vehicle ahead based on the measurement values is available as a vehicle driving support system.

FIG. 14 is a block diagram to schematically show the main part of a radar according to a related art for measuring the distance and the relative velocity between the vehicle and the other vehicle ahead. In the figure, numeral 1 denotes a radar. The radar 1 includes a microcomputer 2, a transmission antenna 3, a pulse transmission unit 4, a reception antenna 5, and a delay detection unit 6. The pulse transmission unit 4 emits an electromagnetic pulse from the transmission antenna 3. The electromagnetic wave emitted from the transmission antenna 3 and striking a target T (for example, the vehicle ahead) is again radiated (namely, reflected) in every direction at the target T and only a part of the electromagnetic wave is returned in the original direction. The reception antenna 5 receives a very small amount of the returned electromagnetic pulse.

The delay detection unit 6 is connected to the pulse transmission unit 4, to keep track of the electromagnetic pulse emitting timing, and is connected to the reception antenna 5, to keep track of the reflection pulse receiving timing, and can detect the time between emitting the electromagnetic pulse and receiving the reflection pulse (namely, delay time). Letting the delay time be $\Delta t$, distance R to the target T can be found as $c\Delta t/2$ (where c is the speed of light and is $3\times10^8$ m/s).

The microcomputer 2 can be connected to the delay detection unit 6, to acquire data concerning the delay time $\Delta t$. The microcomputer 2 includes a distance calculation unit 2a and a relative velocity calculation unit 2b. The distance calculation unit 2a finds the distance R to the target T based on the data concerning the delay time $\Delta t$ provided by the delay detection unit 6. The relative velocity calculation unit 2b monitors the distance R found by the distance calculation unit 2a in time sequence and finds relative velocity $\Delta v$ of the target T based on the change of the distance R with time. Thus, the radar technology is applied and the radar 1 is installed in a vehicle, whereby an excellent driving support system can be realized.

As systems using the radar technology, a preventive safety system for previously detecting a pedestrian and preventing an accident from occurring is proposed in addition to the driving support system. One preventive safety system uses a radar to detect a pedestrian out of the visual range of headlights in the night and a pedestrian on a crosswalk and informs the driver of the presence of the pedestrian.

SUMMARY OF THE INVENTION

The radar according to the related art as described above, can obtain the distance R to the target T and the relative velocity $\Delta v$ of the target T. However, the radar according to the related art cannot determine as to whether or not the target T is a pedestrian (human being) (for example, whether the target T is a human being or another vehicle).

JP-A-Hei. 11-133151 discloses an art wherein an ultrasonic pulse is used and if the reflected wave level coming back from the detection area fluctuates exceeding a preset stipulated level, an object within the detection area is detected as a human being. However, in order to make it possible to set the stipulated level, the detection area needs to be specialized to one area (for example, the front door of a house) and the art disclosed in JP-A-Hei. 11-133151 cannot be adopted for a vehicle with the detection area changing momentarily.

In the art disclosed in JP-A-Hei. 11-133151, whether or not the reflected wave level fluctuates exceeding the stipulated level is only determined and therefore whether or not an invasion object into the detection area exists can be detected, but whether or not the invasion object is a human being (for example, whether the invasion object is a human being or a vehicle) cannot be determined.

By the way, an object that a vehicle collides with is not limited to a pedestrian, of course, and may be another vehicle. It is desirable that steps to be taken at the collision time should be responsive to the object that the vehicle collides with. Thus, for the purpose of lessening harm at the collision time, it is also very important to determine as to whether or not the target T is a human being.

The invention was made in view of the above problems and provides a target determination apparatus for determining whether or not the target is a human being, a target judgment apparatus for judging whether or not the target is a human being, and a determination aid apparatus for aiding the target determination apparatus, which determines the type of target.

As described above, it is very important to determine whether an object existing in the surroundings of a vehicle is a human being or another vehicle. Then, the inventor focused attention on the radar cross section (RCS), which means the effective reflection area, of a human being and that of a vehicle in emitting electromagnetic pulses to the human being and the vehicle as the targets using a radar. The inventor found out that there is a difference between the radar cross section of the human being and that of the vehicle (the radar cross section of the vehicle is larger than that of the human being), and has achieved the invention.

FIG. 3 shows a relationship between the radar cross section and the type of object; for example, it shows that an object with the radar cross section equal to or more than $a_1$ dBm$^2$ and less than $a_2$ dBm$^2$ is a human being and that an object with the radar cross section equal to or more than $a_2$ dBm$^2$ and less than $a_3$ dBm$^2$ is a vehicle (other than a large vehicle), as described later in detail.

The radar cross section is a yardstick to measure the capability of the target for reflecting the applied radio wave toward the direction of the reception antenna of the radar; for example, the radar cross section of a ball with a radius of r is equal to application area $\pi r^2$ if r is sufficiently large as compared with the wavelength.

However, the radar cross section of the target to be here discussed, such as a human being or a vehicle, does not match the physical area of the object, because a general target has a complicated surface and the reflected waves from the target interfere with each other and slight change on the surface gives large change to the radar cross section.

A target determination apparatus for determining type of a target, includes a transmission unit, a reception unit, and a first determination unit. The transmission unit emits an electromagnetic wave. The reception unit receives the electromagnetic wave reflected at the target to obtain reception information. The first determination unit determines the type of the target on the basis of radar cross section of the target obtained from the reception information.

By the way, the expression shown below is a radar equation; transmission power $P_t$ of a radar, power gain G of an antenna (power gain $G_t$ of a transmission antenna, power gain $G_r$ of a reception antenna), and wavelength λ of a radio wave emitted from the radar should be preset (namely, the values of these parameters are known). Reception power $P_r$ and distance R to the target can be obtained from the reception information provided as the reflected wave from the target is received at the reception antenna. Therefore, the reflected wave from the target is received at the reception unit, whereby it is made possible to obtain radar cross section a of the target.

$$P_r = \frac{P_t G^2 \lambda^2 \sigma}{(4\pi)^3 R^4}$$

where
$P_r$: Reception power
$P_t$: Transmission power
G: Power gain of antenna
λ: Wavelength of transmission wave
σ: Radar cross section of target
R: Distance to target In most radars, transmission and reception antennas are shared with each other, in which case power gain $G_t$ of the transmission antenna=power gain $G_r$ of the reception antenna=G.

The target determination apparatus determines the type of target on the basis of the radar cross section of the target obtained from the reception information. For example, if the radar cross section of the target is $x_1$ ($a_1 \leq x_1 < a_2$) dBm$^2$, the target is determined to be a human being (see FIG. 3); if the radar cross section of the target is $x_2$ ($a_2 \leq x_2 < a_3$) dBm$^2$, the target is determined to be a vehicle (other than a large vehicle) (see FIG. 3).

Accordingly, it can be determined as to whether or not the target is a human being, so that the performance of a preventive safety system for preventing a vehicle from colliding with a pedestrian can be enhanced. It can also be determined as to whether an object that a vehicle collides with is a pedestrian or another vehicle, so that the steps to be taken at the collision time can be made in response to the object that the vehicle collides with and the performance of a collision safety system can be enhanced.

A target determination apparatus further includes a first radar-cross-section calculation unit. The first radar-cross-section calculation unit obtains the radar cross section of the target on the basis of reception power of the reflected electromagnetic wave received by the reception unit, distance to the target, transmission power of the electromagnetic wave emitted by the transmission unit, wavelength of the electromagnetic wave emitted by the transmission unit, power gain of the transmission unit, and power gain of the reception unit. The reception power of the reflected electromagnetic wave and the distance to the target are obtained from the reception information. The first determination unit determines the type of the target on the basis of the radar cross section obtained by the first radar-cross-section calculation unit.

As described above, the transmission power $P_t$ of a radar, the power gain G of an antenna (the power gain $G_t$ of a transmission antenna, the power gain $G_r$ of a reception antenna), and the wavelength λ of a radio wave emitted from the radar should be preset (namely, the values of these parameters are known). Also, the reception power $P_r$ and the distance R to the target can be obtained from the information provided as the reflected wave from the target is received at the reception antenna.

According to the target determination apparatus, the radar cross section of the target is obtained on the basis of the reception power $P_r$ of the reflected wave received by the reception unit, the distance R to the target, the transmission power $P_t$ from the transmission unit, the wavelength λ of the radio wave emitted from the transmission unit, the power gain of the transmission unit (namely, the power gain $G_t$ of the transmission antenna), and the power gain of the reception unit (namely, the power gain $G_r$ of the reception antenna); and the type of target is determined on the basis of this radar cross section. Therefore, the radar cross section of the target is obtained with good accuracy and the type of target is determined on the basis of the radar cross section obtained with good accuracy, so that the accuracy of the determination can be enhanced.

A target determination apparatus further includes a first distance calculation unit which obtains the distance to the target on the basis of delay time from the emission of the electromagnetic wave by the transmission unit to the reception of the reflected electromagnetic wave by the reception unit. The first radar-cross-section unit obtains the radar cross section of the target on the basis of the distance to the target obtained by the first distance calculation unit.

Therefore, the information concerning the distance to the target required for obtaining the radar cross section of the target need not be acquired from a different apparatus, so that the apparatus can be simplified and the cost can be reduced.

In a target determination apparatus, the electromagnetic wave emitted by the transmission unit is pulse modulated electromagnetic wave.

To realize a preventive safety system excellent in performance, it is very important to keep track of the distance to the target. To obtain the radar cross section of the target using the radar equation, the distance to the target is necessary. Several methods for measuring the distance to the target are possible; if a dedicated apparatus for measuring the distance to the target is provided, a problem of increasing the cost occurs.

According to the target determination apparatus, the electromagnetic wave transmitted from the transmission unit is an pulse modulated electromagnetic wave (pulse radar), so that the distance to the target can be obtained easily. The distance to the target can be obtained from the time for which the electromagnetic pulse goes to the target and backs. Accordingly, a preventive safety system excellent in performance can be realized without much increasing the cost.

According to an embodiment of the invention, a target determination apparatus for determining type of a target, includes a second determination unit, a first mass calculation unit, and a first energy calculation unit. The second determination unit determines the type of the target on the basis of radar cross section of the target. The first mass calculation unit obtains mass of the target on the basis of the type of the target determined by the second determination unit. The first energy calculation unit obtains energy of the target on the basis of the mass of the target obtained by the first mass calculation unit.

A target determination apparatus according to an embodiment of the invention further includes a second mass calculation unit and a second energy calculation unit. The second mass calculation unit obtains mass of the target on the basis of the type of the target determined by the first determination unit. The second energy calculation unit obtains energy of the target on the basis of the mass of the target obtained by the second mass calculation unit.

To lessen harm at the collision time, it is very important to determine the type of target. To lessen harm in a collision, it is also very important to keep track of the energy of an object that the vehicle collides with. For example, when the energy of the object that the vehicle collides with is large, if the passenger is strongly wrapped in the seat belt and is strongly supported, harm of the passenger may be able to be lessened.

The target determination apparatus obtains the mass of the target on the basis of the type of target and obtains the energy of the target on the basis of the mass of the target. Accordingly, for example, if the energy of the object that the vehicle collides with is large, it is made possible to take steps of strongly wrapping the passenger in the seat belt, so that harm in the collision can be lessened.

As one of the methods for obtaining the mass of the target based on the type of target, the following method can be named: A database storing the correspondence between the type of object and the mass of the object as shown in FIG. 4 described later in detail is provided and the information stored in the database is used to obtain the mass of the target.

In a target determination apparatus according to an embodiment of the invention, the first or second energy calculation unit obtains relative kinetic energy of the target on the basis of the mass of the target obtained by the first or second mass calculation unit and the relative velocity of the target.

The target determination apparatus obtains relative kinetic energy E of the target ($=mv^2/2$) on the basis of the mass m of the target and the relative velocity v of the target. Accordingly, the relative kinetic energy of the target, which is important information to measure the magnitude of the collision, can be obtained, so that the harm in the collision can be still more lessened.

According to an embodiment of the invention, a target judgment apparatus for judging type of a target, includes a target monitor unit, a third determination unit, a fourth determination unit, and a judgment unit. The target monitor unit includes a transmission unit which emits an electromagnetic wave, a reception unit which receives the electromagnetic wave reflected at the target to obtain reception information, and a radar-cross-section calculation unit which calculates radar cross section of the target on the basis of the reception information. The third determination unit determines the type of the target on the basis of the radar cross section provided by the target monitor unit. The fourth determination unit determines the type of the target in a different manner from the third determination unit. The judgment unit judges the type of the target on the basis of determination result of the third determination unit and determination result of the fourth determination unit.

The radar cross section of the target is obtained on the basis of the information provided as the reflected wave from the target is received at the reception unit. However, the reflected waves received at the reception unit contain a reflected wave from any other than the target (so called, clutter), for example, a reflected wave from the ground surface, etc. Thus, it is feared that the calculation accuracy of the radar cross section of the target may be degraded.

If the calculation accuracy of the radar cross section of the target is degraded, the determination accuracy of the type of target and the calculation accuracy of the energy of the target are degraded, resulting in degradation of performance of a preventive safety system or a collision safety system.

The target judgment apparatus judges the type of target considering not only the determination result of the third determination unit for determining the type of target based on the radar cross section of the target, but also the determination result of the fourth determination unit, which determines the type of target in a different manner from the determination manner of the third determination unit. Accordingly, the determination accuracy of the type of target can be enhanced. Thus, the performance of a preventive safety system and a collision safety system can be improved. As the fourth determination unit, for example, a device for determining the type of target on the basis of image information provided by an image photographing unit or the like can be named.

In a target judgment apparatus according to an embodiment of the invention, the target monitor unit is a plurality of the target monitor units. A third determination unit h determines the type of the target on the basis of the radar cross sections provided by the plurality of the target monitor units.

According to the target judgment apparatus, the third determination unit considers not only one determination result of the target monitor unit, but also the plurality of determination results of the target monitor units. Thus, the judgment accuracy of the type of target can be sill more enhanced.

A target judgment apparatus according to an embodiment of the invention the fourth determination unit is a plurality of the fourth determination units. The judgment unit judges the type of the target on the basis of the determination result of the third determination unit and determination results of the plurality of the fourth determination units.

According to the target judgment apparatus, the determination results of the plurality of fourth determination unit rather than one are considered, so that the judgment accuracy of the type of target can be sill more enhanced.

According to an embodiment of the invention, there is provided a determination aid apparatus for aiding a target determination apparatus, which determines type of a target. The determination aid apparatus includes a transmission unit, a reception unit, and a second radar-cross-section calculation unit. The transmission unit emits an electromagnetic wave. The reception unit receives the electromagnetic wave reflected at the target to obtain reception information. The second radar-cross-section calculation unit obtains radar cross section of the target on the basis of reception power of the reflected electromagnetic wave received by the reception unit, distance to the target, transmission power of the electromagnetic wave emitted by the transmission unit, wavelength of the electromagnetic wave emitted by the transmission unit, power gain of the transmission unit, and power gain of the reception unit. The reception power of the reflected electromagnetic wave and the distance to the target are obtained from the reception information.

As described above, the transmission power $P_t$ of a radar, the power gain G of an antenna (the power gain $G_t$ of a transmission antenna, the power gain $G_r$ of a reception antenna), and the wavelength $\lambda$ of a radio wave emitted from the radar should be preset (namely, the values of the parameters are known). Also, the reception power $P_r$ and the distance R to the target can be obtained from the information provided as the reflected wave from the target is received at the reception antenna. Therefore, the reflected wave from the target is received by the reception unit, whereby it is made possible to obtain the radar cross section $\sigma$ of the target. As described above, the type of target can also be determined based on the radar cross section of the target.

According to the determination aid apparatus, the radar cross section of the target is obtained with good accuracy based on the reception power $P_r$ of the reflected wave received by the reception unit, the distance R to the target, the transmission power $P_t$ from the transmission unit, the wavelength $\lambda$ of the radio wave emitted from the transmission unit, the power gain of the transmission unit (namely, the power gain $G_t$ of the transmission antenna), and the power gain of the reception unit (namely, the power gain $G_r$ of the reception antenna). Accordingly, the determination accuracy of the type of target based on the radar cross section of the target can be enhanced.

A determination aid apparatus according to an embodiment of the invention, further includes a second distance calculation unit. The second distance calculation unit obtains the distance to the target on the basis of delay time from the emission of the electromagnetic wave by the transmission unit to the reception of the reflected electromagnetic wave by the reception unit. The second radar-cross-section unit obtains the radar cross section of the target on the basis of the distance to the target obtained by the second distance calculation unit.

BRIEF DESCRIPTION OF THE DRAWINGS

FIG. 3 shows an example of data indicating a relationship between the radar cross section and the type of object.

FIG. 6 shows an example of data indicating a relationship between the type of object and the mass of the object.

FIG. 12 shows an example of data indicating a relationship between the radar cross section and the type of object.

FIG. 13 is a block diagram to schematically show the main part of a target determination system including a target determination apparatus according to a another embodiment of the invention.

DETAILED DESCRIPTION OF THE PREFERRED EMBODIMENT

Figure 1:
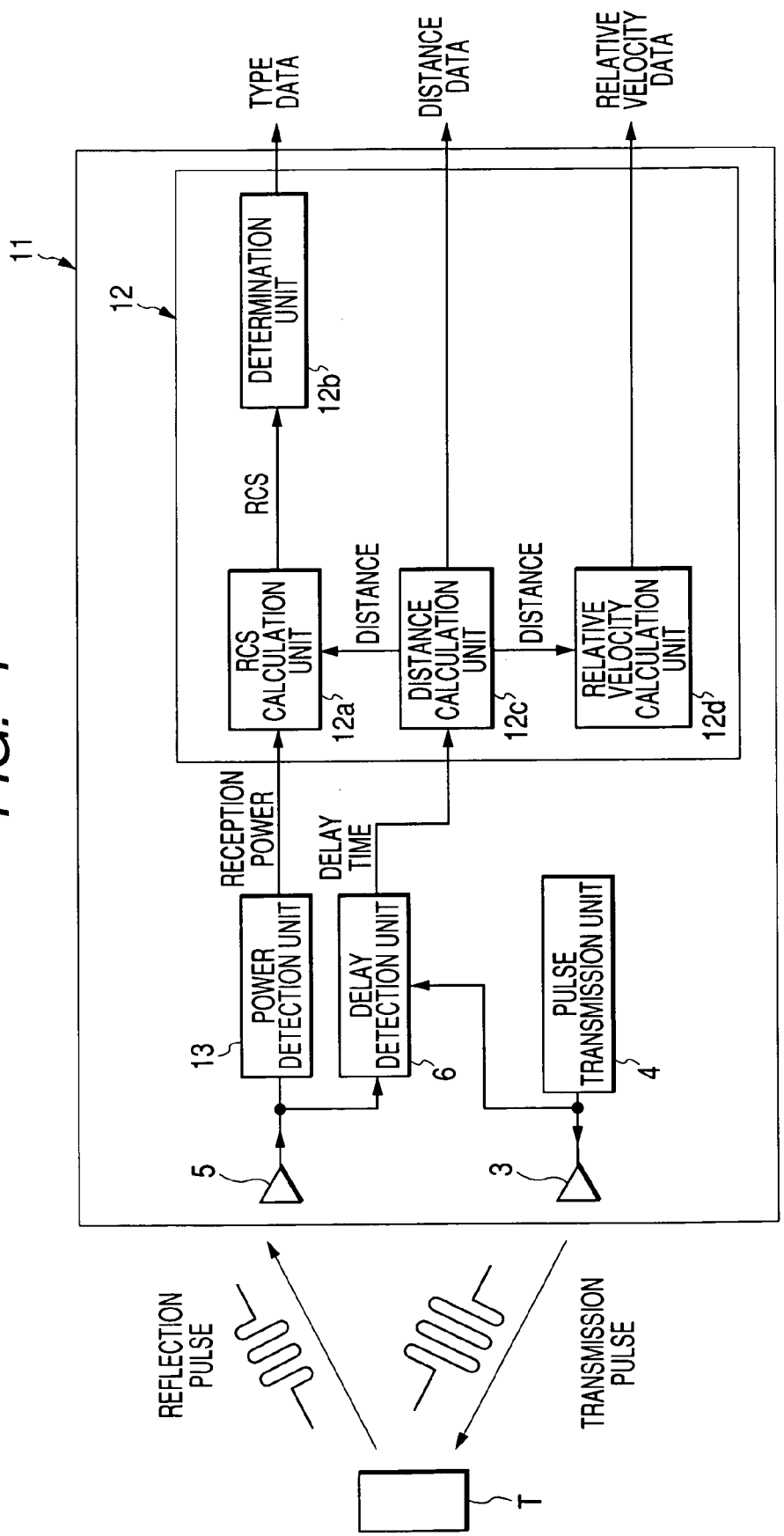
FIG. 1 is a block diagram to schematically show the main part of a target determination apparatus according to a first embodiment of the invention.
Figure 14:
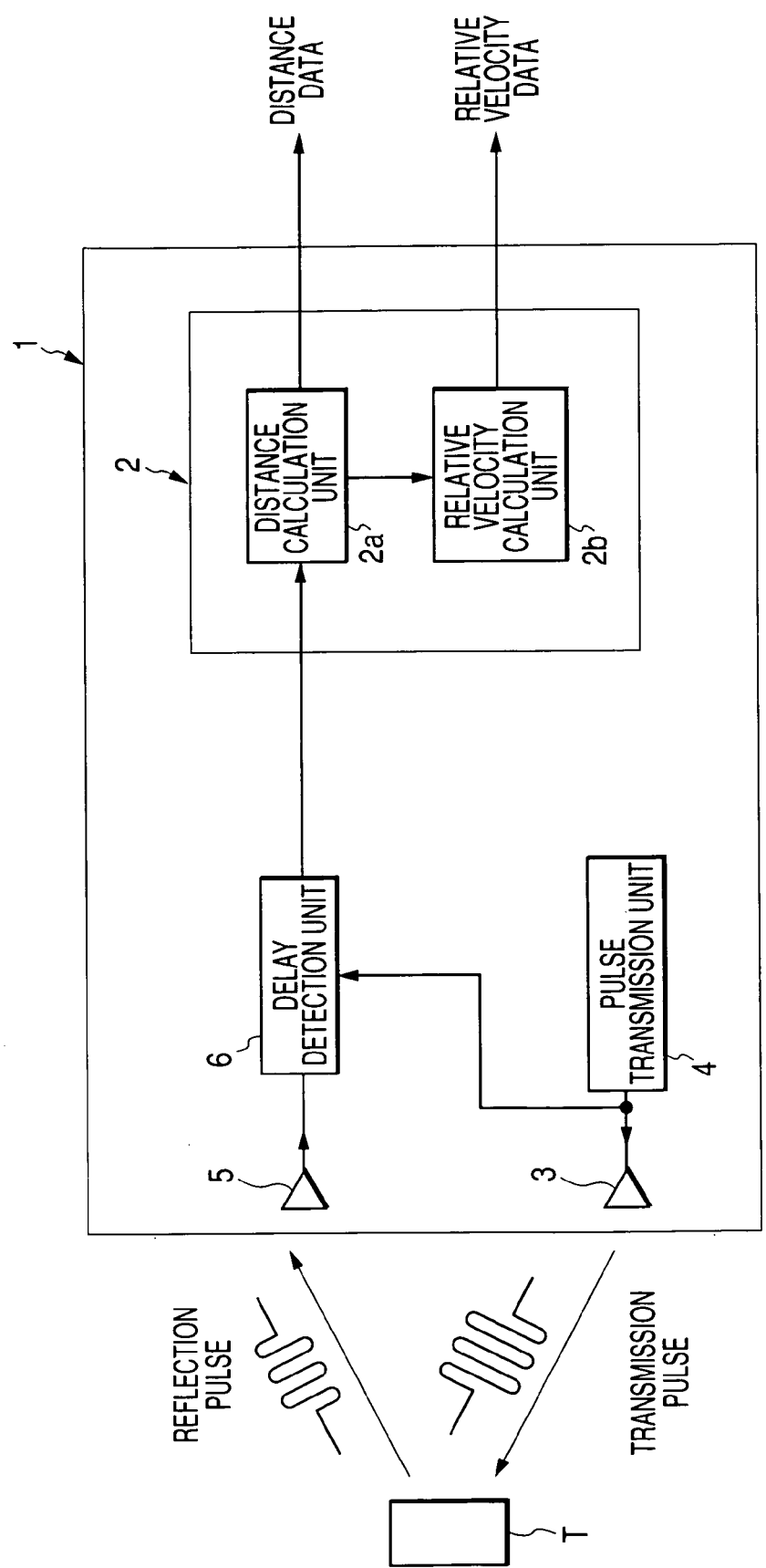
FIG. 14 is a block diagram to schematically show the main part of a radar according to a related art.

Referring now to the accompanying drawings, there are shown preferred embodiments of a target determination apparatus, a target judgment apparatus, and a determination aid apparatus according to embodiments of the invention. FIG. 1 is a block diagram to schematically show the main part of a target determination apparatus according to a first embodiment of the invention. Components similar to those of the radar 1 previously described with reference to FIG. 14 are denoted by the same reference numerals in FIG. 1.

In the figure, numeral 11 denotes a radar for monitoring an object existing ahead of a vehicle M. The radar 11 includes a microcomputer 12, a transmission antenna 3, a pulse transmission unit 4, a reception antenna 5, a delay detection unit 6, and a power detection unit 13. Power gain $G_t$ of the transmission antenna 3 and power gain $G_r$ of the reception antenna 5 are the same (power gain G).

The pulse transmission unit 4 emits an electromagnetic pulse of wavelength $\lambda$ with transmission power $P_t$ from the transmission antenna 3. The electromagnetic wave, which is emitted from the transmission antenna 3 and strikes a target T (for example, the vehicle ahead), is again radiated (namely, reflected) in every direction at the target T and only a part of the electromagnetic wave is returned in the original direction. The reception antenna 5 receives a very small amount of the electromagnetic pulse.

The delay detection unit 6 is connected to the pulse transmission unit 4 and can keep track of the electromagnetic pulse emitting timing. The delay detection unit 6 is also connected to the reception antenna 5 and can keep track of the reflection pulse receiving timing and can detect the time between emitting the electromagnetic pulse and receiving the reflection pulse (namely, delay time). Letting the delay time be $\Delta t$, distance R to the target T can be found as $c\Delta t/2$ (where c is the speed of light and $3\times10^8$ m/s).

The power detection unit 13 is connected to the reception antenna 5, to detect the reception power of the signal received at the reception antenna 5 and can detect reception power $P_r$ of the reflection pulse received at the reception antenna 5.

The microcomputer 12 is connected to the delay detection unit 6 to acquire data concerning the delay time $\Delta t$ and is connected to the power detection unit 13 to acquire data concerning the reception power $P_r$ of the signal received at the reception antenna 5. The microcomputer 12 includes a radar cross section (RCS) calculation unit 12a, a determination unit 12b, a distance calculation unit 12c, and a relative velocity calculation unit 12d. The radar cross section (RCS) calculation unit 12a calculates radar cross section σ of the target T. The determination unit 12b determines the type of target T. The distance calculation unit 12c obtains the distance R to the target T based on the data concerning the delay time Δt provided by the delay detection unit 6. The relative velocity calculation unit 12d monitors the distance R obtained by the distance calculation unit 12c in time sequence and obtains relative velocity v of the target T based on the change of the distance R with time.

Figure 2:
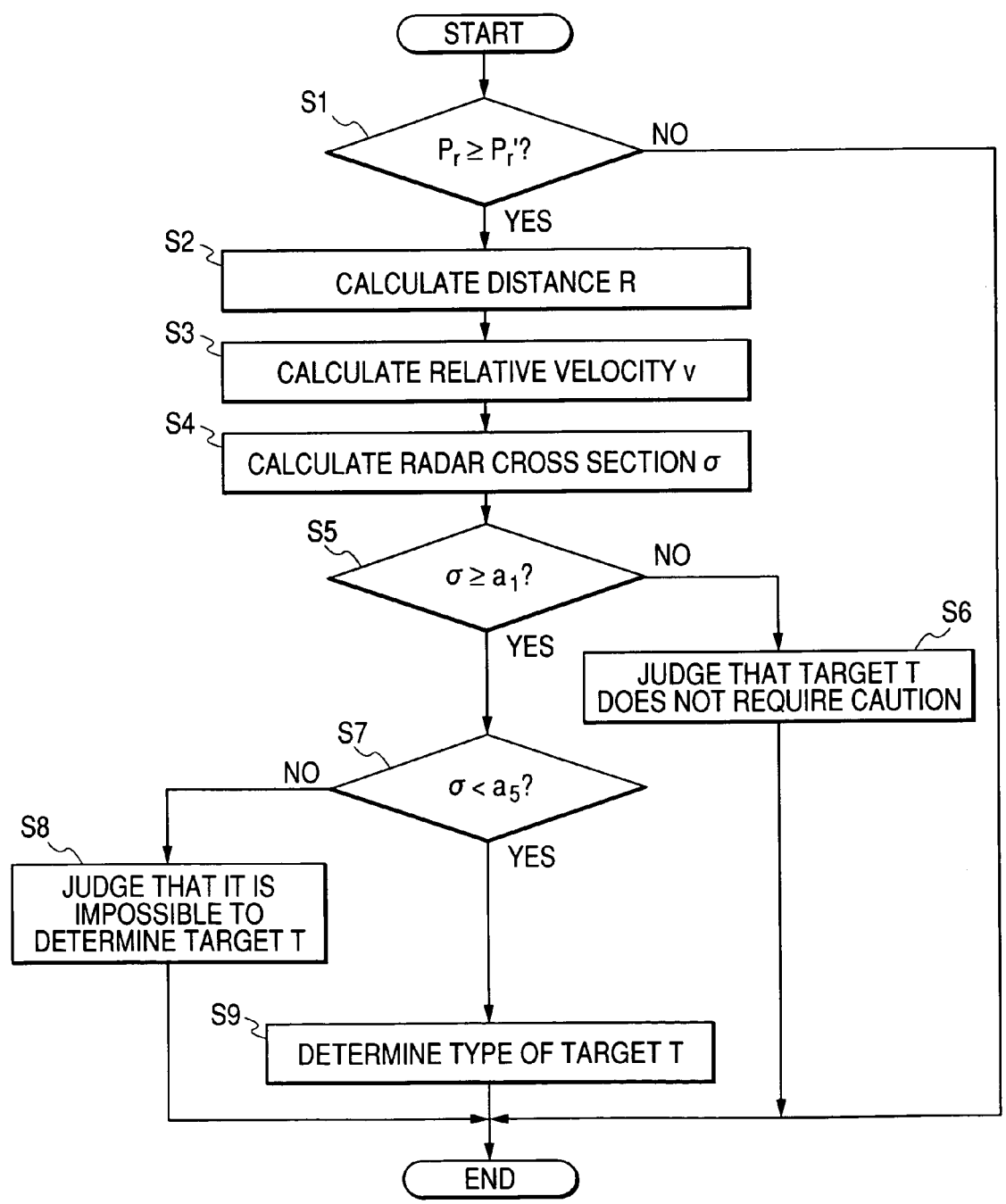
FIG. 2 is a flowchart to show the processing operation performed by a microcomputer in the target determination apparatus according to the first embodiment of the invention.

A processing operation (1) performed by the microcomputer 12 in the target determination apparatus (radar 11) according to the first embodiment will be discussed with a flowchart of FIG. 2. To begin with, it is determined as to whether or not a signal with the reception power $P_r$ equal to or more than a predetermined value $P_r'$ is received on the basis of the data concerning the reception power $P_r$ provided by the power detection unit 13 (step S1). If it is determined that a signal with the reception power $P_r$ equal to or more than the predetermined value $P_r'$ is received, it is assumed that an object (target T) exists ahead of the vehicle M. Next, the distance R to the target T is obtained based on the data concerning the delay time Δt provided by the delay detection unit 6 (step S2) and the relative velocity v of the target T is obtained based on the change of the obtained distance R with time (step S3). On the other hand, if it is determined at step S1 that a signal with the reception power $P_r$ equal to or more than the predetermined value $P_r'$ is not received, step S2 and the later steps need not be executed and therefore the processing operation (1) is terminated.

Next, the radar cross section σ of the target T is calculated based on the transmission power $P_t$ of the radar 11, the power gain $G_t$ of the transmission antenna 3 (=G), the power gain $G_r$ of the reception antenna 5 (=G), the wavelength λ of radio wave emitted from the radar 11, the reception power $P_r$ detected by the power detection unit 13, and the distance R obtained at step S2 using the following radar equation (step S4):

$$P_r = \frac{P_t G^2 \lambda^2 \sigma}{(4\pi)^3 R^4}$$

Next, it is determined as to whether or not the radar cross section σ is equal to or more than $a_1$ (see FIG. 3) (step S5). If it is not determined that the radar cross section σ is equal to or more than $a_1$, it is judged that the target T does not require caution (step S6). On the other hand, if it is determined that the radar cross section σ is equal to or more than $a_1$, it is determined as to whether or not the radar cross section σ is less than $a_5$ (see FIG. 3) (step S7). If it is determined that the radar cross section σ is equal to or more than $a_5$, it is judged that it is impossible to determine the type of target T (step S8).

On the other hand, if it is determined that the radar cross section σ is less than $a_5$ (namely, $a_1 \leq \sigma < a_5$), then the type of target T is determined based on the radar cross section σ and data indicating the relationship between the radar cross section and the type of object as shown in FIG. 3 stored in memory (not shown) in the microcomputer 12 (step S9). FIG. 3 shows an example of the data indicating the relationship between the radar cross section and the type of object; for example, it shows that an object with the radar cross section equal to or more than $a_1$ dBm² and less than $a_2$ dBm² is a human being, that the object with the radar cross section equal to or more than $a_2$ dBm² and less than $a_3$ dBm² is a vehicle (other than a large vehicle), that an object with the radar cross section equal to or more than $a_3$ dBm² and less than $a_4$ dBm² is a vehicle (large), and that an object with the radar cross section equal to or more than $a_4$ dBm² and less than $a_5$ dBm² is a building.

The target determination apparatus (radar 11) according to the first embodiment determines the type of target T based on the radar cross section σ of the target T. For example, if the radar cross section σ of the target T is $x_1$ ($a_1 \leq x_1 < a_2$) dBm², the target T is determined to be a human being (see FIG. 3); if the radar cross section σ of the target T is $x_2$ ($a_2 \leq x_2 < a_3$) dBm², the target T is determined to be a vehicle (small or medium-sized vehicle) (see FIG. 3).

Accordingly, it can be determined as to whether or not the target T is a human being, so that the performance of a preventive safety system for preventing the vehicle M from colliding with a pedestrian can be enhanced. It can also be determined as to whether an object that the vehicle M collides with is a pedestrian or another vehicle, so that the steps to be taken at the collision time can be made in response to the object that the vehicle M collides with and the performance of a collision safety system can be enhanced.

Figure 4:
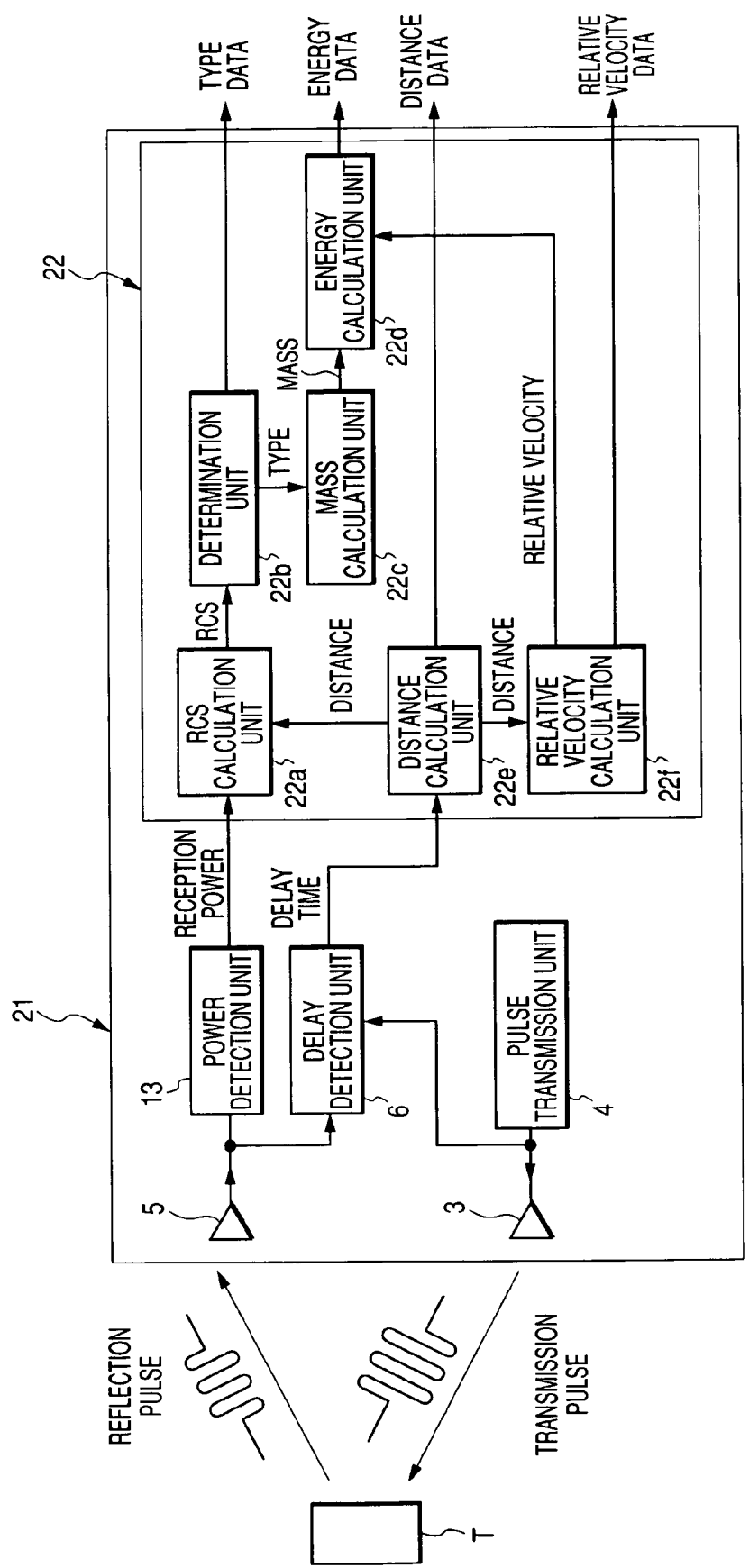
FIG. 4 is a block diagram to schematically show the main part of a target determination apparatus according to a second embodiment of the invention.
Figure 5:
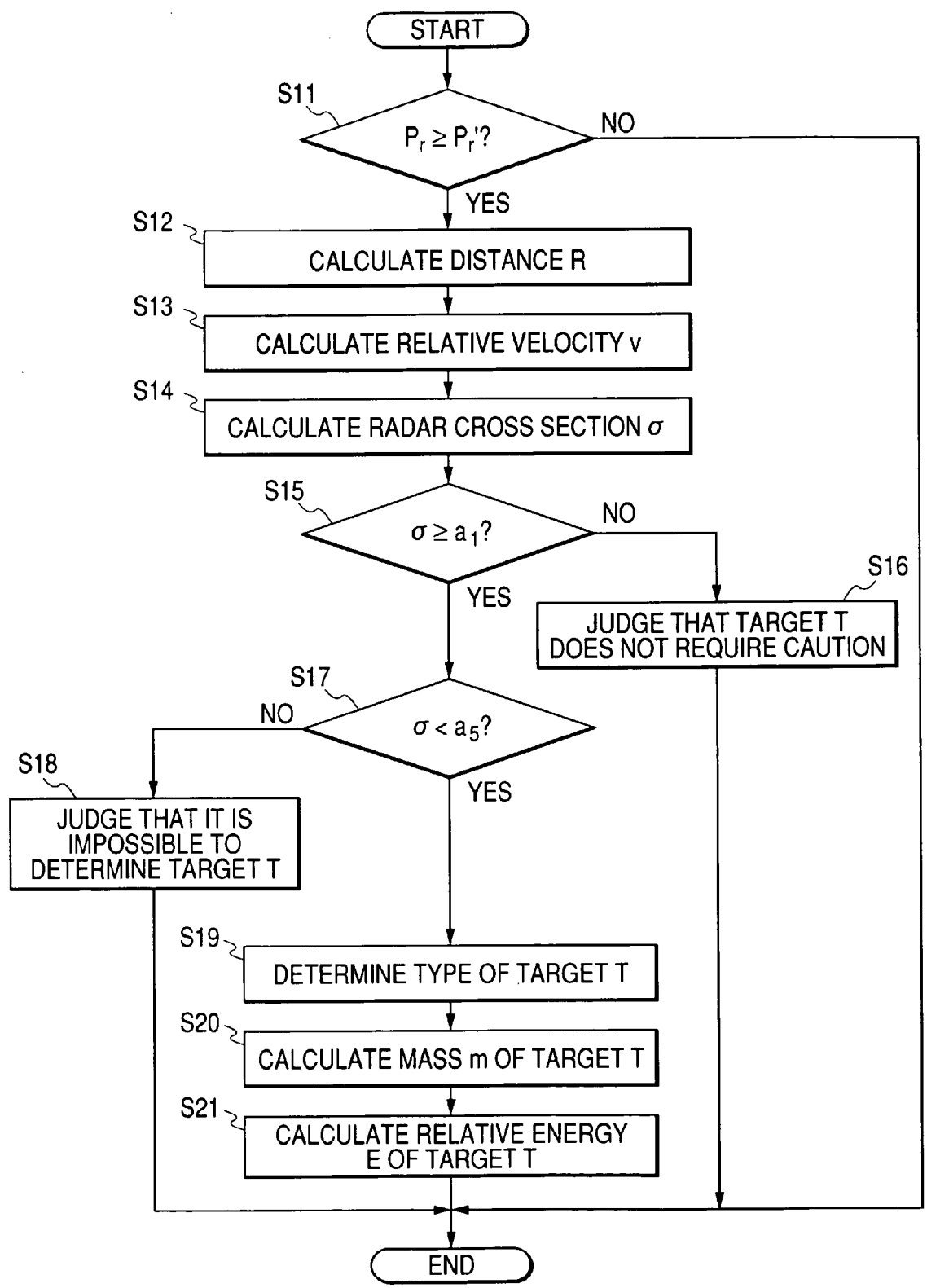
FIG. 5 is a flowchart to show the processing operation performed by a microcomputer in the target determination apparatus according to the second embodiment of the invention.

FIG. 4 is a block diagram to schematically show the main part of a target determination apparatus according to a second embodiment of the invention. Components similar to those of the target determination apparatus (radar 11) previously described with reference to FIG. 1 are denoted by the same reference numerals in FIG. 4 and will not be discussed again. In the figure, numeral 21 denotes a radar for monitoring an object existing ahead of a vehicle M. The radar 21 includes a microcomputer 22, a transmission antenna 3, a pulse transmission unit 4, a reception antenna 5, a delay detection unit 6, and a power detection unit 13.

The microcomputer 22 can is connected to the delay detection unit 6 to acquire data concerning delay time Δt and is connected to the power detection unit 13 to acquire data concerning reception power $P_r$ of the signal received at the reception antenna 5. The microcomputer 22 includes a radar cross section (RCS) calculation unit 22a, a determination unit 22b, a mass calculation unit 22c, a energy calculation unit 22d, a distance calculation unit 22e, and a relative velocity calculation unit 22f. The radar cross-section (RCS) calculation unit 22a calculates radar cross section a of a target T. The determination unit 22b determines the type of target T. The mass calculation unit 22c obtains the mass of the target T. The energy calculation unit 22d obtains relative energy of the target T. The distance calculation unit 22e obtains the distance R to the target T based on the data concerning the delay time Δt provided by the delay detection unit 6. The relative velocity calculation unit 22f monitors the distance R obtained by the distance calculation unit 22e in time sequence and obtains relative velocity v of the target T based on the change of the distance R with time.

A processing operation performed by the microcomputer 12 in the target determination apparatus (radar 11) according to the first embodiment will be discussed with a flowchart of FIG. 2. To begin with, it is determined as to whether or not a signal with the reception power $P_r$ equal to or more than a predetermined value $P_r'$ is received on the basis of the data concerning the reception power $P_r$ provided by the power detection unit 13 (step S1). If it is determined that a signal with the reception power $P_r$ equal to or more than the predetermined value $P_r'$ is received, it is assumed that an object (target T) exists ahead of the vehicle M. Next, the distance R to the target T is obtained based on the data concerning the delay time Δt provided by the delay detection unit 6 (step S2) and the relative velocity v of the target T is obtained based on the change of the obtained distance R with time (step S3). On the other hand, if it is determined at step S1 that a signal with the reception power $P_r$ equal to or more than the predetermined value $P_r'$ is not received, step S2 and the later steps need not be executed and therefore the processing operation is terminated.

Next, the radar cross section σ of the target T is calculated on the basis of the transmission power $P_t$ of the radar 21, power gain $G_t$ of the transmission antenna 3 (=G), power gain $G_r$ of the reception antenna 5 (=G), the wavelength λ of radio wave emitted from the radar 11, the reception power $P_r$ detected by the power detection unit 13, and the distance R obtained at step S12 using the following radar equation (step S14):

$$P_r = \frac{P_t G^2 \lambda^2 \sigma}{(4\pi)^3 R^4}$$

Next, it is determined as to whether or not the radar cross section σ is equal to or more than $a_1$ (see FIG. 3) (step S15). If it is determined that the radar cross section σ is less than $a_1$, it is judged that the target T does not require caution (step S16). On the other hand, if it is determined that the radar cross section σ is equal to or more than $a_1$, it is determined as to whether or not the radar cross section σ is less than $a_5$ (see FIG. 3) (step S17). If it is determined that the radar cross section σ is equal to or more than $a_5$, it is judged that it is impossible to determine the type of target T (step S18).

On the other hand, if it is determined that the radar cross section σ is less than $a_5$ (namely, $a_1 \leq \sigma < a_5$), then the type of target T is determined on the basis of the radar cross section a and data indicating the relationship between the radar cross section and the type of object as shown in FIG. 3 stored in memory (not shown) in the microcomputer 22 (step S19).

Next, mass m of the target T is obtained on the basis of data indicating the relationship between the type of object and the mass of the object as shown in FIG. 6 stored in the memory (not shown) in the microcomputer 22 and the type of target T determined at step S19 (step S20). Then, relative energy E of the target T to the vehicle M (=$mv^2/2$) is obtained on the basis of the mass m of the target T and the relative velocity v of the target T obtained at step S13 (step S21). FIG. 6 shows an example of the data indicating the relationship between the type of object and the mass of the object; for example, it shows that the mass of a human being is 100 kg, that the mass of a vehicle (other than a large vehicle) is 1,500 kg, that the mass of a vehicle (large) is 3,000 kg, and that the mass of a building is 10,000 kg.

The target determination apparatus (radar 21) according to the second embodiment determines the type of target T on the basis of the radar cross section σ of the target T. For example, if the radar cross section σ of the target T is $x_1$ ($a_1 \leq x_1 < a_2$) dBm², the target T is determined to be a human being (see FIG. 3); if the radar cross section σ of the target T is $x_2$ ($a_2 \leq x_2 < a_3$) dBm², the target T is determined to be a vehicle (small or medium-sized vehicle) (see FIG. 3). Further, the mass of the target T is obtained from the type of target T and the relative energy E of the target T to the vehicle M is obtained.

Accordingly, it can be determined as to whether or not the target T is a human being, so that the performance of a preventive safety system for preventing the vehicle M from colliding with a pedestrian can be enhanced. It can also be determined as to whether the object that the vehicle M collides with is a pedestrian or another vehicle, so that the steps to be taken at the collision time can be made in response to the object that the vehicle M collides with and the performance of the collision safety system can be enhanced.

Further, the relative energy E of the object that the vehicle M collides with can be obtained. Thus, it is made possible to take steps of strongly wrapping the passenger in the seat belt, for example, if the relative energy E of the object that the vehicle M collides with is large, so that a collision safety system that can lessen harm in the collision can be realized.

Figure 7:
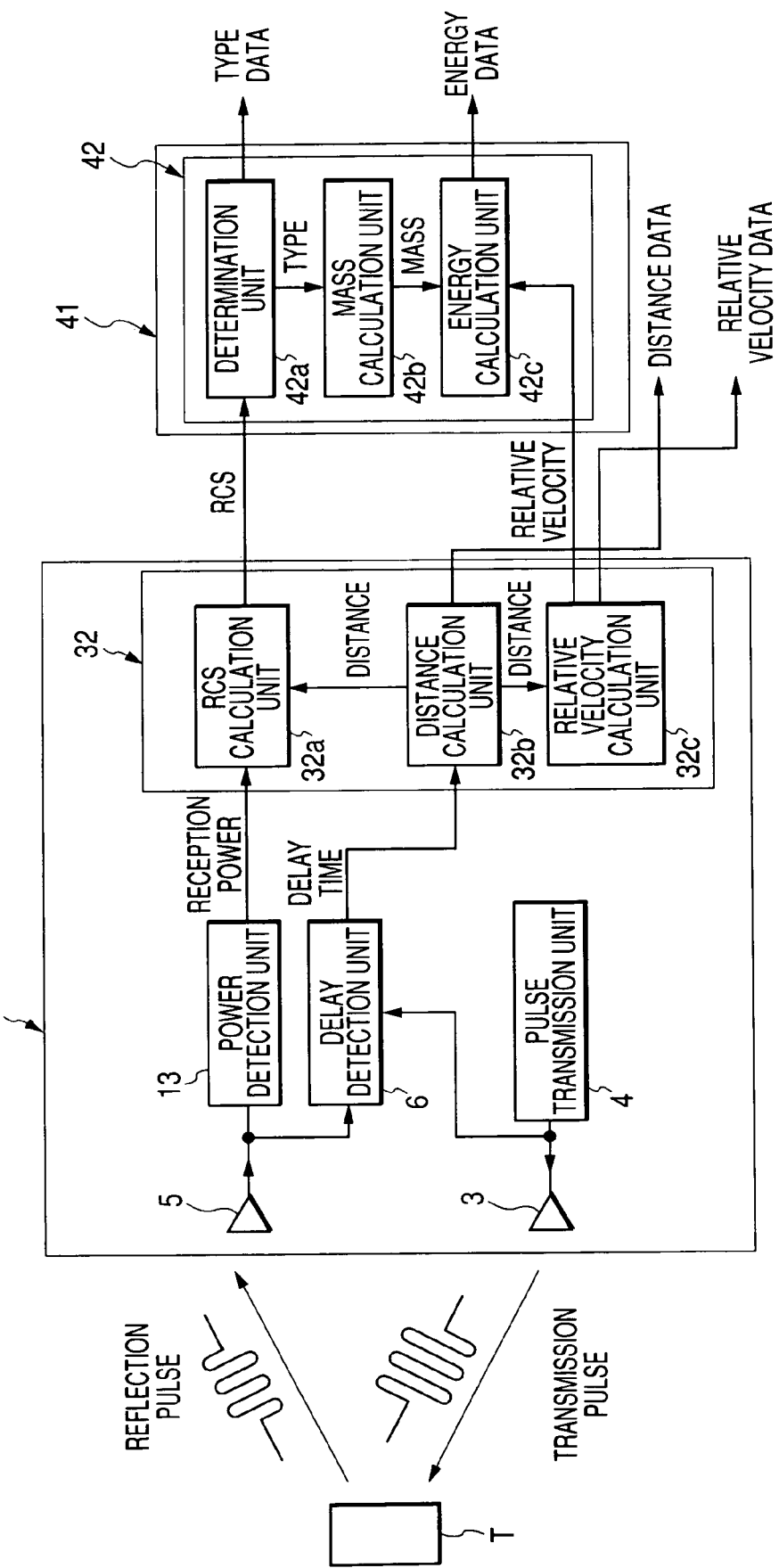
FIG. 7 is a block diagram to schematically show the main part of a target determination system including a target determination apparatus and a determination aid apparatus according to a third embodiment of the invention.

The target determination apparatus (radar 11 or 21) according to the first or second embodiment includes a monitor device, which monitors an object existing ahead of the vehicle M. However, a target determination apparatus according to another embodiment may have no monitor device, which monitoring an object. FIG. 7 shows an example.

FIG. 7 is a block diagram to schematically show the main part of a target determination system including a target determination apparatus and a determination aid apparatus according to a third embodiment of the invention. Components similar to those of the target determination apparatus (radar 11) previously described with reference to FIG. 1 are denoted by the same reference numerals in FIG. 7 and will not be discussed again.

In the figure, numeral 31 denotes a radar for monitoring an object existing ahead of a vehicle M. The radar 31 includes a microcomputer 32, a transmission antenna 3, a pulse transmission unit 4, a reception antenna 5, a delay detection unit 6, and a power detection unit 13.

The microcomputer 32 is connected to the delay detection unit 6 to acquire data concerning delay time Δt and is connected to the power detection unit 13 to acquire data concerning reception power $P_r$ of the signal received at the reception antenna 5. The microcomputer 32 includes a radar cross section (RCS) calculation unit 32a, a distance calculation unit 32b, and a relative velocity calculation unit 32c. The radar cross-section (RCS) calculation unit 32a calculates radar cross section a of a target T. The distance calculation unit 32b obtains the distance R to the target T on the basis of the data concerning the delay time Δt provided by the delay detection unit 6. The relative velocity calculation unit 32c monitors the distance R obtained by the distance calculation unit 32b in time sequence and obtains relative velocity v of the target T on the basis of the change of the distance R with time.

In FIG. 7, numeral 41 denotes a target determination apparatus connected to the radar 31. The target determination apparatus 41 can input the data concerning the radar cross section σ of the target T and the data concerning the relative velocity v of the target T obtained by the radar 31. The target determination apparatus 41 includes a microcomputer 42, which having a determination unit 42a, a mass calculation unit 42b, and an energy calculation unit 42c. The determination unit 42a determines the type of target T. The mass calculation unit 42b obtains the mass of the target T. The energy calculation unit 42c obtains relative energy of the target T.

Figure 8:
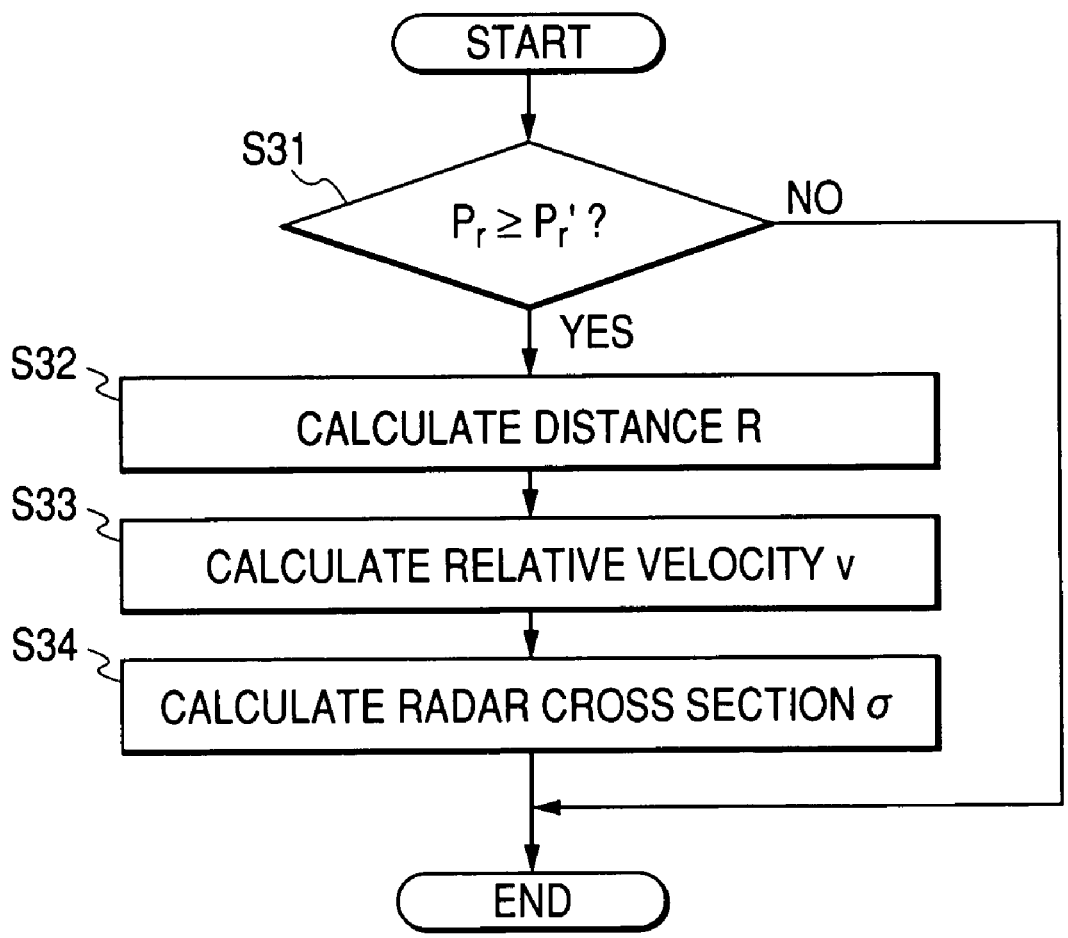
FIG. 8 is a flowchart to show the processing operation performed by a microcomputer in the determination aid apparatus according to the third embodiment of the invention.

A processing operation performed by the microcomputer 32 in the determination aid apparatus (radar 31) according to the third embodiment will be discussed with reference to a flowchart of FIG. 8. To begin with, it is determined as to whether or not a signal with the reception power $P_r$ equal to or more than a predetermined value $P_r'$ is received, on the basis of the data concerning the reception power $P_r$ provided by the power detection unit 13 (step S31). If it is determined that a signal with the reception power $P_r$ equal to or more than the predetermined value $P_r'$ is received, it is assumed that an object (target T) exists ahead of the vehicle M. Next, the distance R to the target T is obtained on the basis of the data concerning the delay time $\Delta t$ provided by the delay detection unit 6 (step S32) and the relative velocity v of the target T is obtained on the basis of the change of the obtained distance R with time (step S33). On the other hand, if it is determined at step S31 that a signal with the reception power $P_r$ equal to or more than the predetermined value $P_r'$ is not received, step S32 and the later steps need not be executed and therefore processing operation is terminated.

Next, the radar cross section a of the target T is calculated on the basis of the transmission power $P_t$ of the radar 31, power gain $G_t$ of the transmission antenna 3 (=G), power gain $G_r$ of the reception antenna 5 (=G), the wavelength $\lambda$ of radio wave emitted from the radar 31, the reception power $P_r$ detected by the power detection unit 13, and the distance R obtained at step S32 using the following radar equation (step S34):

$$P_r = \frac{P_t G^2 \lambda^2 \sigma}{(4\pi)^3 R^4}$$

Figure 9:
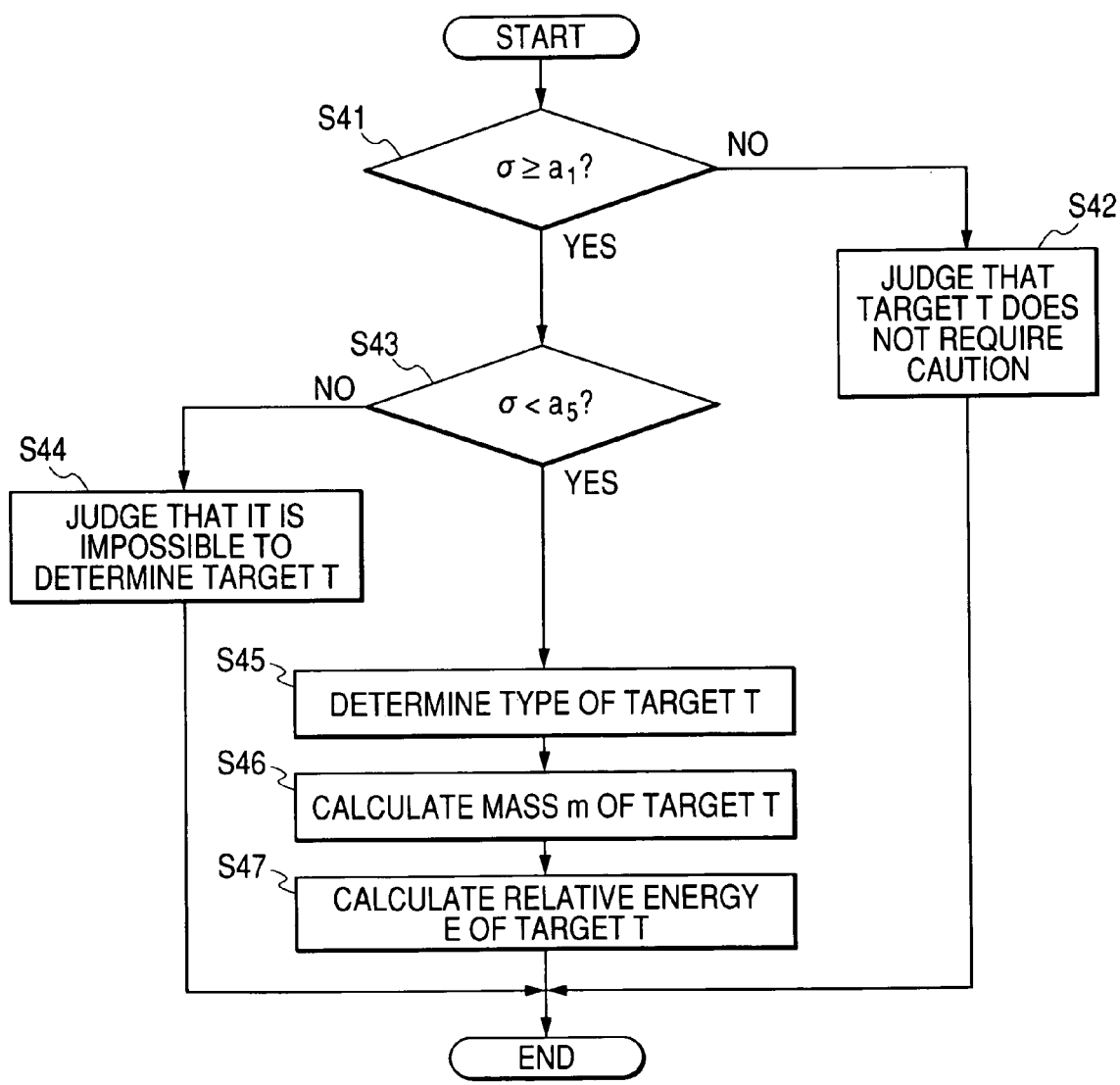
FIG. 9 is a flowchart to show the processing operation performed by a microcomputer in the target determination apparatus according to the third embodiment of the invention.

Next, a processing operation performed by the microcomputer 42 in the target determination apparatus 41 according to the third embodiment will be discussed with reference to a flowchart of FIG. 9. To begin with, it is determined as to whether or not the radar cross section $\sigma$ is equal to or more than $a_1$ (see FIG. 3), on the basis of the data provided by the radar 31 (step S41). If it is determined that the radar cross section C is less than $a_1$, it is judged that the target T does not require caution (step S42). On the other hand, if it is determined that the radar cross section $\sigma$ is equal to or more than $a_1$, it is determined as to whether or not the radar cross section $\sigma$ is less than $a_5$ (see FIG. 3) (step S43). If it is determined that the radar cross section $\sigma$ is equal to or more than $a_5$, it is judged that it is impossible to determine the type of target T (step S44).

Next, mass m of the target T is obtained on the basis of data indicating the relationship between the type of object and the mass of the object as shown in FIG. 6 stored in the memory (not shown) in the microcomputer 42 and the type of target T determined at step S45 (step S46) and then relative energy E of the target T to the vehicle M (=$mv^2/2$) is obtained on the basis of the mass m of the target T and the relative velocity v of the target T provided by the radar 31 (step S47).

Figure 15:
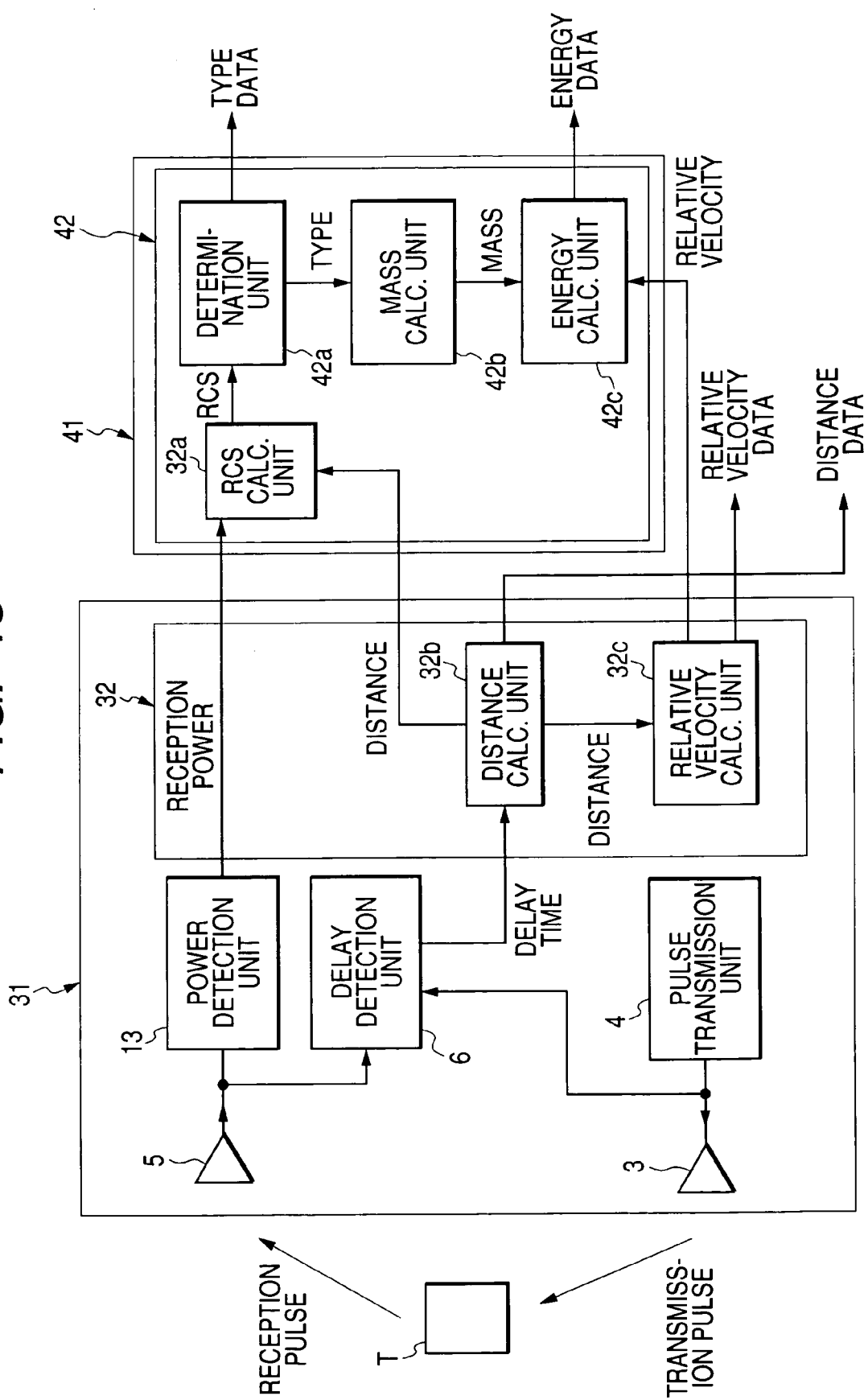
FIG. 15 is a block diagram to schematically show the main part of a target determination system including a target determination apparatus and a determination aid apparatus according to a modified embodiment.

In the third embodiment, the determination aid apparatus 31 (microcomputer 32) includes the RCS calculation unit 32a and outputs the radar cross section $\sigma$. However, in a modified embodiment, the determination aid apparatus 31 may not include the RCS calculation unit 32a. Instead, the target determination apparatus 41 may include the RCS calculation unit 32a in the microcomputer 42 as shown in FIG. 15. In this case, the target determination apparatus 41 (the RCS calculation unit 32a) calculates the radar cross section a on the basis of the data concerning the reception power $P_r$ provided by the determination aid apparatus 31.

Figure 10:
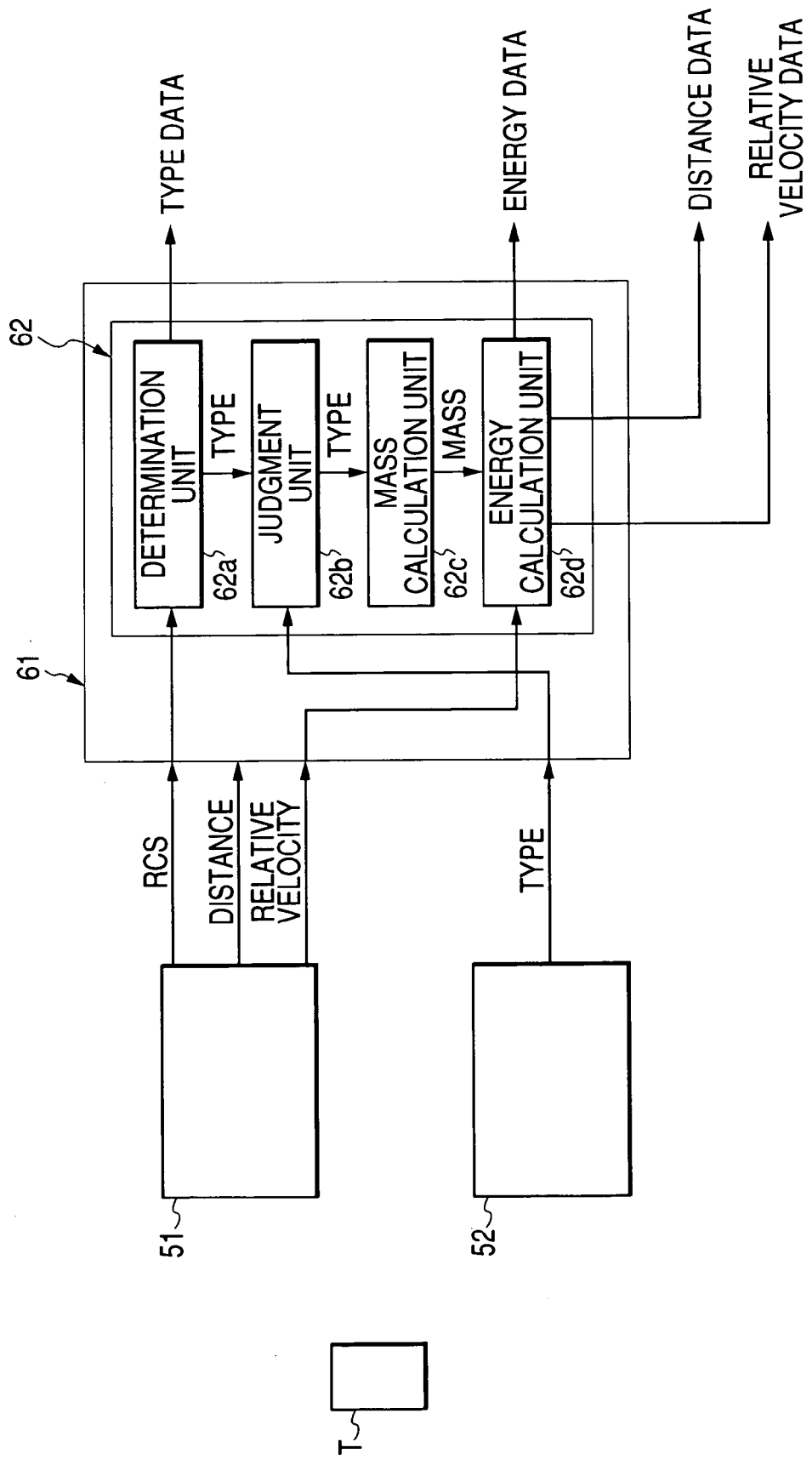
FIG. 10 is a block diagram to schematically show the main part of a target determination system including a target determination apparatus according to a fourth embodiment of the invention.

FIG. 10 is a block diagram to schematically show the main part of a target determination system including a target determination apparatus according to a fourth embodiment of the invention. In the figure, numerals 51 and 52 denote target monitoring units installed in a vehicle M and including a monitor device, which monitors an object existing ahead of the vehicle M.

The target monitoring unit 51 has a similar configuration to that of the radar 31 shown in FIG. 7 and can obtain radar cross section a of a target T, distance R to the target T, and relative velocity v of the target T. On the other hand, the target monitoring unit 52 can determine the type of target T from an image acquired by a camera.

In FIG. 10, numeral 61 denotes a target determination apparatus connected to the target monitoring units 51 and 52. The target determination apparatus 61 can input the data concerning the radar cross section a of the target T, the distance R to the target T, and the relative velocity v of the target T, which are obtained by the target monitoring unit 51, and the data concerning the type of target T determined by the target monitoring unit 52. The target determination apparatus 61 includes a microcomputer 62. The microcomputer 62 includes a determination unit 62a, a judgment unit 62b, amass calculation unit 62c, and an energy calculation unit 62d. The determination unit 62a determines the type of target T on the basis of the radar cross section a of the target T. The judgment unit 62b judges the type of target T on the basis of the type of the target T provided by the target monitoring unit 52. The mass calculation unit 62c obtains the mass of the target T. The energy calculation unit 62d obtains relative energy of the target T.

Figure 11:
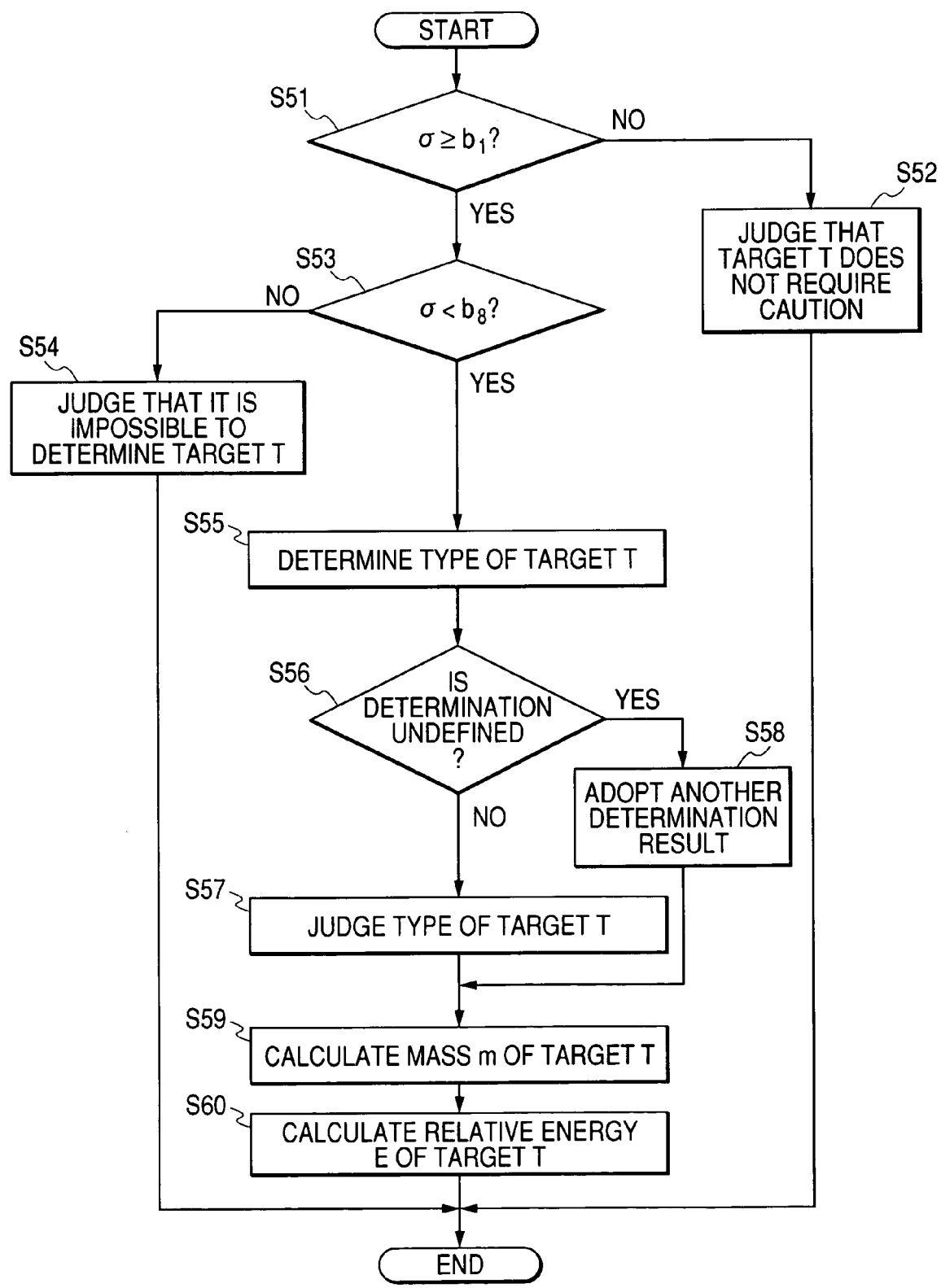
FIG. 11 is a flowchart to show the processing operation performed by a microcomputer in the target determination apparatus according to the fourth embodiment of the invention.

A processing operation performed by the microcomputer 62 in the target determination apparatus 61 according to the fourth embodiment will be discussed with reference to a flowchart of FIG. 11. To begin with, it is determined as to whether or not the radar cross section $\sigma$ is equal to or more than $b_1$ (see FIG. 12) (step S51), on the basis of the data provided by the target monitoring unit 51. If it is not determined that the radar cross section $\sigma$ is equal to or more than $b_1$, it is judged that the target T does not require caution (step S52). On the other hand, if it is determined that the radar cross section $\sigma$ is equal to or more than $b_1$, then it is determined as to whether or not the radar cross section $\sigma$ is less than $b_8$ (see FIG. 12) (step S53). If it is determined that the radar cross section $\sigma$ is equal to or more than $b_8$, it is judged that it is impossible to determine the type of target T (step S54).

On the other hand, if it is determined that the radar cross section $\sigma$ is less than $b_8$ (namely, $b_1 \leq \sigma < b_8$), then the type of target T is determined on the basis of the radar cross section $\sigma$ and data indicating the relationship between the radar cross section and the type of object as shown in FIG. 12 stored in memory (not shown) in the microcomputer 62 (step S55).

FIG. 12 shows an example of the data indicating the relationship between the radar cross section and the type of object; for example, it shows that an object with the radar cross section equal to or more than $b_1$ dBm$^2$ and less than $b_2$ dBm$^2$ is a human being, that an object with the radar cross section equal to or more than $b_3$ dBm$^2$ and less than $b_4$ dBm$^2$ is a vehicle (other than a large vehicle), that an object with the radar cross section equal to or more than $b_5$ dBm$^2$ and less than $b_6$ dBm$^2$ is a vehicle (large), that an object with the radar cross section equal to or more than $b_7$ dBm$^2$ and less than $b_8$ dBm$^2$ is a building, and that an object with the radar cross section equal to or more than $b_2$ dBm$^2$ and less than $b_3$ dBm$^2$, equal to or more than $b_4$ dBm$^2$ and less than $b_5$ dBm$^2$, or equal to or more than $b_6$ dBm$^2$ and less than $b_7$ dBm$^2$ belongs to a gray zone.

Next, it is determined as to whether or not the radar cross section a of the target T corresponds to the gray zone (namely, whether or not the determination result of the type of target T based on the radar cross section σ is undefined) If it is determined that the radar cross section σ of the target T does not correspond to the gray zone, the determination result at step S55 is adopted as the type of target T (step S57) and then the process goes to step S59. On the other hand, if it is determined that the radar cross section a of the target T corresponds to the gray zone, the determination result of the target monitoring unit 52 is adopted as the type of target T (step S58) and then the process goes to step S59.

Next, mass m of the target T is obtained on the basis of data indicating the relationship between the type of object and the mass of the object as shown in FIG. 6 stored in the memory (not shown) in the microcomputer 62 and the type of target T judged at step S57 or S58 (step S59). Then, relative energy E of the target T to the vehicle M (=mv²/2) is obtained on the basis of the mass m of the target T and the relative velocity v of the target T provided by the target monitoring unit 51 (step S60).

The target determination apparatus according to the fourth embodiment judges the type of target T considering not only the determination result of the determination unit 62a, which determines the type of target T based on the radar cross section σ of the target T, but also the determination result of the target monitoring unit 52, which determines the type of target T in the different manner from the determination manner of the determination unit 62a. Accordingly, the determination accuracy of the type of target T can be enhanced and thus the performance of a preventive safety system and a collision safety system can be improved.

The target determination apparatus according to the fourth embodiment obtains the energy of the target T from the mass of the target T, which is obtained on the basis of the data indicating the relationship between the type of object and the mass of the object as shown in FIG. 6. However, a target determination apparatus according to another embodiment may obtain the energy of the target T from the size (mass) of the target T estimated from the acquired image.

A target determination apparatus according to still another embodiment may determine the type of target T based on data input from a plurality of target monitoring units 51 (or similar units) installed at different locations or may determine the type of target T based on data input from a plurality of target monitoring units installed at different locations for determining the type of target T in different manner from the determination manner based on the radar cross section of the target T. FIG. 13 is a block diagram to schematically show an example of the target determination apparatus. In the figure, numeral 71 denotes a target determination apparatus. The target determination apparatus 71 is connected to a plurality of target monitoring units 51 and 52.

The target determination apparatus according to the fourth embodiment inputs the data concerning the radar cross section of the target T from the target monitoring unit 51. However, a target determination apparatus according to another embodiment may input the data concerning the type of target T from a target monitoring unit of a similar configuration to that of the radar 11 and may skip the determination processing of the target T.

Only the cases using the pulse radar have been described. However, implementing of the target determination apparatus, the target judgment apparatus, and the determination aid apparatus according to the invention is not limited to the pulse radar; any modification may be made so long as an apparatus can measure the parameters required for calculating the radar cross section of the target T. For example, an apparatus for transmitting a continuous wave signal such as a CW radar, a UWB (Ultra Wide Band) system, or the like may be adopted.

What is claimed is:

1. A target determination apparatus for determining type of a target, comprising:
   a transmission unit which emits an electromagnetic wave;
   a reception unit which receives the electromagnetic wave reflected at the target to obtain reception information;
   a first determination unit which determines the type of the target on the basis of a radar cross section of the target obtained from the reception information;
   a mass calculation unit which obtains mass of the target on the basis of the type of the target determined by the first determination unit; and
   an energy calculation unit which obtains energy of the target on the basis of the mass of the target obtained by the mass calculation unit.

2. The target determination apparatus according to claim 1, wherein the first determination unit determines that the type of the target is one of human being, a vehicle, and a building.

3. The target determination apparatus according to claim 1, further comprising:
   a first radar-cross-section calculation unit which obtains the radar cross section of the target on the basis of reception power of the reflected electromagnetic wave received by the reception unit, distance to the target, transmission power of the electromagnetic wave emitted by the transmission unit, wavelength of the electromagnetic wave emitted by the transmission unit, power gain of the transmission unit, and power gain of the reception unit, wherein:
   the reception power of the reflected electromagnetic wave and the distance to the target are obtained from the reception information; and
   the first determination unit determines the type of the target on the basis of the radar cross section obtained by the first radar-cross-section calculation unit.

4. The target determination apparatus according to claim 3, further comprising:
   a first distance calculation unit which obtains the distance to the target on the basis of delay time from the emission of the electromagnetic wave by the transmission unit to the reception of the reflected electromagnetic wave by the reception unit, wherein:
   the first radar-cross-section unit obtains the radar cross section of the target on the basis of the distance to the target obtained by the first distance calculation unit.

5. The target determination apparatus according to claim 1, wherein the electromagnetic wave emitted by the transmission unit is a pulse-modulated electromagnetic wave.

6. A target determination apparatus for determining type of a target, comprising:
   a determination unit which determines the type of the target on the basis of radar cross section of the target;
   a first mass calculation unit which obtains mass of the target on the basis of the type of the target determined by the determination unit; and
   a first energy calculation unit which obtains energy of the target on the basis of the mass of the target obtained by the first mass calculation unit.

7. The target determination apparatus according to claim 6, wherein the radar cross section of the target is input to the determination unit from an external source.

8. The target determination apparatus according to claim 6, further comprising a radar-cross-section calculation unit which calculates the radar cross section of the target on the basis of data input from an external source.

9. The target determination apparatus according to claim 6, wherein the first energy calculation unit obtains relative kinetic energy of the target on the basis of the mass of the target obtained by the first mass calculation unit and relative velocity of the target.

10. The target determination apparatus according to claim 1, wherein the energy calculation unit obtains relative kinetic energy of the target on the basis of the mass of the target obtained by the mass calculation unit and relative velocity of the target.

11. A target judgment apparatus for judging type of a target, comprising:
   a target monitor unit including:
   a transmission unit which emits an electromagnetic wave;
   a reception unit which receives the electromagnetic wave reflected at the target to obtain reception information; and
   a radar-cross-section calculation unit which calculates radar cross section of the target on the basis of the reception information;
   a first determination unit which determines the type of the target on the basis of the radar cross section provided by the target monitor unit;
   a second determination unit which determines the type of the target in a different manner from the first determination unit; and
   a judgment unit which judges the type of the target on the basis of determination result of the first determination unit and determination result of the second determination unit.

12. The target judgment apparatus according to claim 11, wherein:
   the target monitor unit is a plurality of the target monitor units; and
   the first determination unit which determines the type of the target on the basis of the radar cross sections provided by the plurality of the target monitor units.

13. The target judgment apparatus according to claim 11, wherein:
   the second determination unit is a plurality of the second determination units; and
   the judgment unit judges the type of the target on the basis of the determination result of the first determination unit and determination results of the plurality of the second determination units.

14. A determination aid apparatus for aiding a target determination apparatus, which determines type of a target, the determination aid apparatus comprising:
   a transmission unit which emits an electromagnetic wave;
   a reception unit which receives the electromagnetic wave reflected at the target to obtain reception information; and
   a radar-cross-section calculation unit which obtains a radar cross section of the target on the basis of reception power of the reflected electromagnetic wave received by the reception unit, distance to the target, transmission power of the electromagnetic wave emitted by the transmission unit, wavelength of the electromagnetic wave emitted by the transmission unit, power gain of the transmission unit, and power gain of the reception unit;
   a mass calculation unit which obtains mass of the target on the basis of the type of the target determined by the first determination unit; and
   an energy calculation unit which obtains energy of the target on the basis of the mass of the target obtained by the mass calculation unit, wherein:
   the reception power of the reflected electromagnetic wave and the distance to the target are obtained from the reception information.

15. The determination aid apparatus according to claim 14, further comprising:
   a distance calculation unit which obtains the distance to the target on the basis of delay time from the emission of the electromagnetic wave by the transmission unit to the reception of the reflected electromagnetic wave by the reception unit, wherein:
   the radar-cross-section unit obtains the radar cross section of the target on the basis of the distance to the target obtained by the distance calculation unit.

* * * * *